(12) United States Patent
Haines et al.

(10) Patent No.: US 7,020,249 B1
(45) Date of Patent: Mar. 28, 2006

(54) VOICE INTERFACE UNIT FOR LINE CONDITIONER CONTROL

(75) Inventors: Robert H. Haines, Fort Lee, NJ (US); Jayant M. Naik, Cincinnati, OH (US); Srinivasan X. Gopalaswamy, Stamford, CT (US)

(73) Assignee: Telesector Resources Group, Inc., New York, NY (US)

( * ) Notice: Subject to any disclaimer, the term of this patent is extended or adjusted under 35 U.S.C. 154(b) by 0 days.

(21) Appl. No.: 10/818,139

(22) Filed: Apr. 5, 2004

(51) Int. Cl.
*H04M 1/24* (2006.01)
*H04M 3/08* (2006.01)
*H04M 3/22* (2006.01)

(52) U.S. Cl. ............... 379/27.01; 379/1.01; 379/22.05; 379/26.01

(58) Field of Classification Search ............... 379/1.01, 379/15.01, 21, 22, 22.05, 25, 26.01, 27.01, 379/29.01, 29.06, 88.01, 88.02
See application file for complete search history.

(56) References Cited

U.S. PATENT DOCUMENTS 5,615,225 A * 3/1997 Foster et al. ............. 379/29.01
5,903,625 A * 5/1999 May ............................ 379/21
5,974,115 A * 10/1999 Chan et al. ............... 379/27.01
6,002,746 A * 12/1999 Mulcahy et al. ............... 379/22
6,493,425 B1 * 12/2002 Abe ............................ 379/1.01
6,704,393 B1 * 3/2004 Beck ........................ 379/27.01

* cited by examiner

*Primary Examiner*—Quoc Tran
(74) *Attorney, Agent, or Firm*—Leonard C. Suchyta, Esq.; Joel Wall, Esq.; Straub & Pokotylo

(57) ABSTRACT

Interfacing to and controlling POTS line conditioning devices using a Voice Interface Unit (VIU) are described. Technicians perform tests and checks while a POTS line is in a conditioned state. The VIU provides a centralized voice input/voice output interface allowing technicians to identify and request various conditioning options using speech. The VIU identifies a line conditioning unit to be used to test a line corresponding to a phone number via a database lookup. The VIU controls the identified line conditioning unit to connect to the POTS line. The VIU provides the technician with an easy to use voice input/output universal interface irrespective of the particular manufacturer/model of line conditioning device by performing conversions to the various protocols and instruction sets used by different manufactures. The VIU includes individual security controls and multiple access levels. The VIU may include load/simulator, call back, and keypad test capability.

24 Claims, 8 Drawing Sheets

VOICE INTERFACE UNIT FOR LINE CONDITIONER CONTROL

FIELD OF THE INVENTION

The present invention relates generally to the field of communications systems and, more particularly to the field of Plain Old Telephone Service (POTS) line conditioning device interface and control.

BACKGROUND

Local telephone companies frequently need to send technicians out to customer sites to service a subscriber's POTS (Plain Old Telephone Service) line(s). A POTS line may sometimes be referred to as a copper telephone wire pair. Service activities may include functions such as troubleshooting a noisy or intermittent line, disconnecting a line, connecting a new line, and checking a customer's telephone. In order to assist in the troubleshooting and tasks of a field service technician, local telephone companies have deployed line conditioning test devices at their central offices. These line conditioning test devices allow a technician, using DTMF signaling, to request conditioning and/or testing of a subscriber's line, e.g., open line, short line, apply test frequency tones to line, etc. for requested periods of time. While the line is conditioned in a particular state, e.g., a specific tone sequence has been injected onto the line, the technician may perform a test task, e.g., locate the wire pair to be serviced from among several wire pairs at a customer site or an intermediate site.

FIG. 1 is a diagram of exemplary communication system under test 100 employing a known decentralized architecture and using various line conditioning test devices in central offices. FIG. 1 includes a first subscriber communication device 102, e.g., a first telephone, a first field service technician 104, a field service technician communication device, e.g., a second telephone 106, a DTMF I/O test device 128, test equipment 130 and central office 1 108. Central Office 1 includes a central office switch 110 and a plurality of frame responders, frame responder 1 112, frame responder 2 114, frame responder N 116. A frame responder is a line conditioning device manufactured by CMC. Each frame responder 112, 114, 116 is coupled to the central office switch 110 via a no test trunk device 118, 120, 122, respectively. First subscriber communications device 102 is coupled to central office switch 110 via a first POTS line 124, e.g., a copper line wire pair. POTS line 124 is the line that technician 104 is servicing. Field service technician communications device 106 is coupled to central office switch 110 via a second POTS line 126 or the line under test 124. Test Equipment 130 may include ohmmeters, voltmeters meters, oscilloscopes, signal detection devices, signal recording devices, etc.

The field service technician 104 may need to service a POTS line 124. Field service technician 104 may place a call to a specific phone number corresponding to a specific frame responder, e.g., frame responder 2 114 at central office 1 108 that may be coupled to POTS line 124. The call may be placed from first subscriber communications device 102 or from field service technician communications device 106. The technician may enter a password, enter the number of the subscriber line to condition, request a type and duration of conditioning, etc. In cases, where the call originates from first subscriber communications device 102, the technician will hang-up after placing the call and wait a specified length of time before line conditioning will be performed. Input to the frame responder is in DTMF tones and output from the frame responder, e.g., an acknowledgment signal to a requested command is also in DTMF. Therefore the operator can use a DTMF I/O test device 128 which can interpret the ACK/NAK signaling returned from frame responder. After the line has been conditioned, the technician 104 may perform a specified test, e.g., check the line for the presence, strength, and/or SNR of a test signal using test equipment 130.

FIG. 1 also includes a second subscriber communication device 132, e.g., a third telephone, a second field service technician 134, a field service technician communication device 136, e.g., a fourth telephone, test equipment 137 and central office 2 138. Central Office 2 includes a central office switch 140 and a plurality of DATU (Direct Access Testing Units), DATU 1 142, DATU 2 144, DATU N 146. The DATU is a widely deployed line conditioning device manufactured by Harris. Each DATU 142, 144, 146 is coupled to the central office switch 140 via a no test trunk device 148, 150, 152, respectively. Second subscriber communications device 132 is coupled to central office switch 140 via a third POTS line 154, e.g., a copper line wire pair. POTS line 154 is the line that second technician 134 is servicing. Field service technician communications device 136 is coupled to central office switch 140 via a fourth POTS line 139. Test Equipment 137 may include ohmmeters, voltmeters, oscilloscopes, signal detection devices, signal recording devices, etc.

The field service technician 134 may need to service POTS line 154. Field service technician 134 may place a call to a specific phone number corresponding to a specific DATU, e.g., DATU 2 144 at central office 2 138 that may be coupled to POTS line 154. The call may be placed from second subscriber communications device 132 or from field service technician communications device 136. The technician may enter a password, enter the number of the subscriber line to condition, request a type and duration of conditioning, etc. In cases, where the call originates from first subscriber communications device 102 or the field service technician communications device 132 connected to POTS line 154, the technician will hang-up after placing the call and wait a specified length of time before line conditioning will be performed. Input to the DATU is in DTMF tones and output from the DATU, e.g., a message indicating "OK, line busy, etc." to a request or entry is in voice. After the line has been conditioned, the technician 134 may perform a specified test, e.g., check the line for the presence, strength, and/or SNR of a test signal using test equipment 137.

In order to use a line conditioning device, with the known system architecture 100, the field service technician 104, 134 needs to know to which central office 108, 138 the POTS line to be serviced 124, 154 is connected. In addition, the technician 104, 134 needs to know the phone number and password associated with the line conditioning device that may be used at that central office. If a technician places a call to a line conditioning device not associated with the POTS line to be tested, the access will fail.

As shown in exemplary system architecture 100, there exist several different types of line conditioning devices, e.g., different manufactures and different models/versions by the same manufacturer. Each different line conditioning device may have a different interfaces, different operational procedures, and/or different functions/options. This creates additional problems for the field service technician 104, 134. The technician 104, 134 needs learn how to access and use the variety of line conditioning devices deployed at central offices. The technician 104, 134 may need to carry a variety of interface devices/test equipment devices that may be specific to match a particular line conditioning device. In addition, each time a technician 104, 134 accesses a line conditioning device, the technician needs to identify which type of line conditioning device is being accessed.

The security employed with many known line conditioning devices is minimal. In many cases, the access numbers of line conditioning devices at central offices are easily available to non-authorized personnel. In addition passwords for access are distributed to a large number of technicians, and are typically not changed each time an individual employee leaves the service provider.

Based upon the above discussion, it may be appreciated that methods and apparatus which remove the burden from the technician to properly identify the central office, the line conditioning device number and corresponding type of line conditioning devices to be used for a specific POTS line would be beneficial. In addition there is room for new methods and apparatus that provide for a more user friendly interface to line conditioning devices. Methods and apparatus that provide a common user interface, a common set of instructions and/or a common set of commands applicable to a wide variety of vendor, type and/or model of line conditioning devices would be beneficial. Automation of various line conditioning instructions and/or frequently used combinations of instructions would also be useful. There is room for improvements in security methods controlling and tracking access to line conditioning devices. Improvements as described above could result in increased use of line conditioning devices by technicians, reduced problems due to improper operator input and/or operator procedural errors, increased overall service efficiency, reduced field service costs, reduced field service repair time, reduced unauthorized access, and/or increased customer satisfaction.

SUMMARY

The present invention is directed to methods and apparatus for interfacing with line conditioning devices. A Voice Interface Unit (VIU) of the invention provides access to, and control of, POTS line conditioning devices, e.g., through voice signals. The VIU simplifies the field service technicians' interaction with line conditioning devices. The VIU provides a centralized control point and a centralized access number, e.g., a 1-800 number, for accessing a plurality of line conditioning devices at a plurality of central offices. The field service technician calls the number of the VIU, logs-in, and supplies the number of the POTS line for which conditioning is being requested. The VIU through database lookup determines the local central office for the requested POTS line number and line conditioning unit to be used, assigns a line conditioner at that central office, and causes the line conditioner to connect to the POTS line. This is in contrast to known currently used methods where the technician needs to identify the central office matching the POTS line that he would like conditioned. This known process of requiring the technician to identify the central office becomes increasingly difficult with local number portability. In addition, with known methods, the technician needs to maintain a list of many different phone numbers, each different phone number corresponding to a different line conditioner (or Central Office) whereby once the technician identifies the appropriate line conditioner he/she must place a call to the corresponding phone number.

The VIU of the present invention includes a voice input/voice output user interface, speech recognition, text to speech conversion, and DTMF processing modules. The VIU also supports a mode of operation which provides a user with a universal or common set of interface instructions/responses and operational procedure irrespective of the particular manufacturer, type, and/or model of line conditioning device being used. This is in sharp contrast to known methods of line conditioner interface which require a technician to be familiar with and utilize a unique command instruction set and interface procedure for each different manufacture's line conditioning device and/or model. In addition it provides advantages over known interface methods which require manufacturer specific DTMF input commands and/or special test equipment for the user to interface with the line conditioning device.

The VIU of the present invention provides for improved security of access and control to line conditioning devices over known methods. The VIU includes individual user log-in capabilities, with support for individual user passwords, and provides for different levels of access for different groups and/or individual users. This is in contrast to current security methods which use a single infrequently changed password at each line conditioner that must be known to all the technicians which may need to use the line conditioning unit. The VIU also includes a secure interface to a telephone operations network and includes encryption capability. The VIU also issues alerts and sends information, e.g., to a security server, of detected unauthorized access attempts.

The VIU has access and interfaces with a variety of databases and application servers. In some embodiments, the VIU includes a load/test simulator providing a system self-test capability which is useful for identifying faults in the system and providing the user with comparison data/information collected under well controlled load conditions. The VIU may include other features and options such as a call back capability and a keypad test capability. In some embodiments, the VIU includes supervisory level modes and functions such as a database access mode and a contact mode.

Usage information of the VIU and/or line conditioning devices is automatically collected by the VIU and sent to be stored in a service provider database, e.g., is sent to a data warehouse device. Status of the line conditioning units and equipment under the control of the VIU are also collected automatically and automatic warnings are sent out when problems are detected by the VIU. The VIU can distinguish between busy conditions, network problems and hardware problems.

A call to the VIU, e.g., requesting line conditioning to a specific POTS line, may be placed through a different line or through the same POTS line to be conditioned. In such cases, where the request for conditioning is placed from the same line to be conditioned, the technician may hang-up after inputting the requested command(s), with the VIU subsequently controlling a line conditioning unit to perform the requested conditioning on the POTS line. In some embodiments, the technician may place the call to the VIU using a wireless device, e.g., the technician's cell phone, and the call shall be routed through a base station to the VIU.

In some embodiments, the VIU system includes a Web interface providing ease of insertion, modification, and deletion of database information, e.g., line conditioner database information, to authorized individuals as well as access information to contact the proper supervisory personnel to locally access, test and repair the line conditioner.

DETAILED DESCRIPTION

Figure 1:
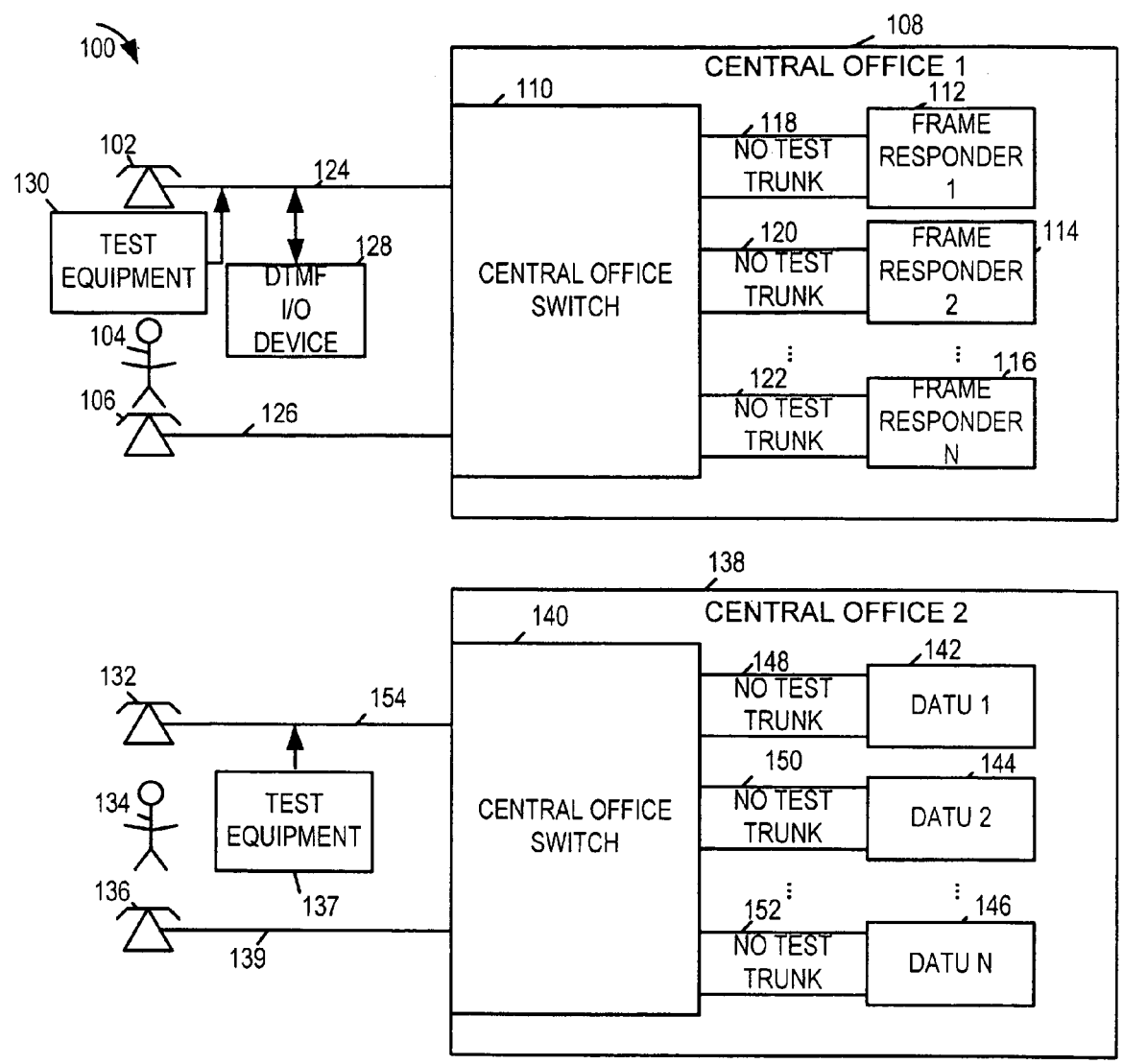
FIG. 1 is a diagram of exemplary communication system under test employing a known decentralized architecture and using various line conditioning test devices in central offices.
Figure 2:
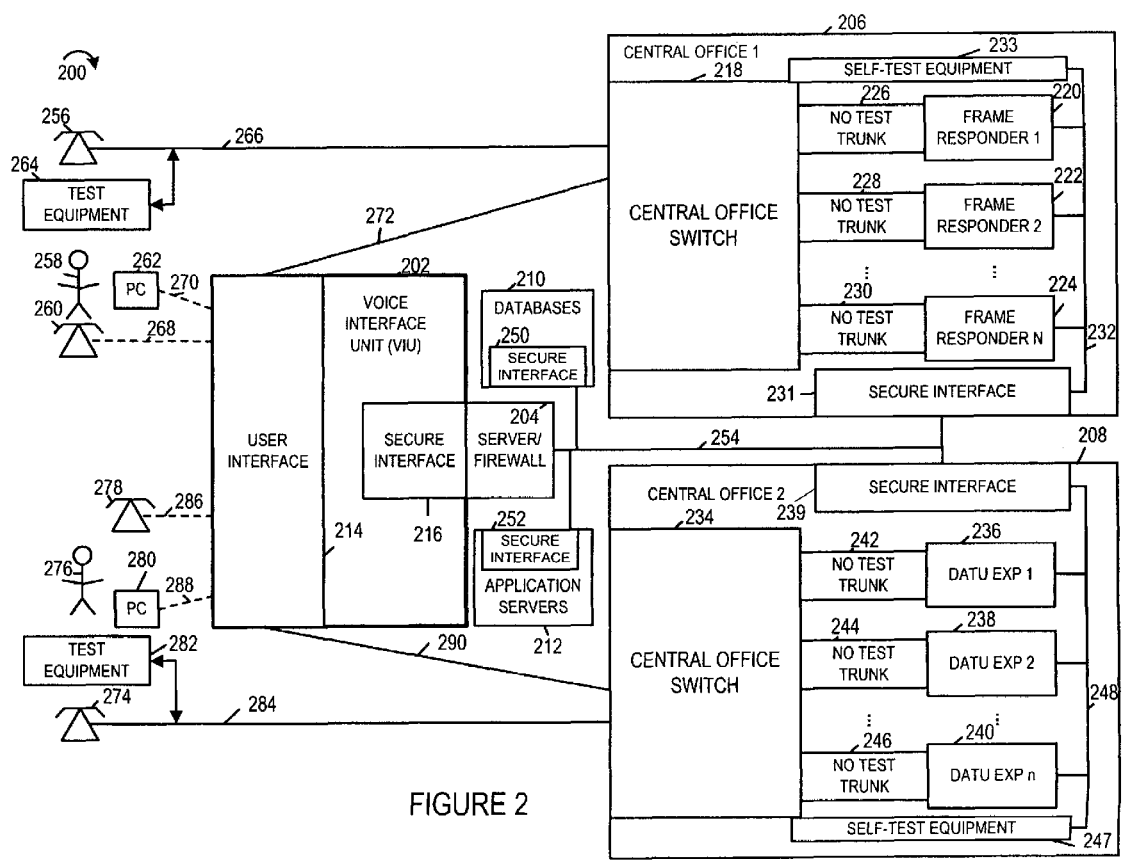
FIG. 2 is a diagram of an exemplary communications system under test, including a voice interface unit, providing a centralized voice input/voice output user interface to various line conditioning devices; the exemplary system implemented in accordance with the present invention.

FIG. 2 illustrates an exemplary communications system under test 200 implemented in accordance with the present invention. Exemplary system 200 provides a centralized control mechanism for access and control of line conditioning devices throughout the system, in accordance with the present invention. Exemplary system under test 200 includes a Voice Interface Unit (VIU) 202, a server/firewall 204, first and second central offices, central office 1 206, central office 2 208, databases 210, and application servers 212. The voice interface unit 202 is the centralized control apparatus through which the various line conditioning devices in the system are selected, accessed and controlled, in accordance with the invention. Voice interface unit 202 includes a user interface 214 and a secure interface 216.

Central office 1 206 includes a central office switch 218 and a plurality of frame responders, frame responder 1 220, frame responder 2 222, frame responder N 224. Within central office 1 206, each frame responder 220, 222, 224 is coupled to central office switch 218 via a no test trunk device 226, 228, 230, respectively. Central office 1 206 also can include a secure interface 231 coupled to each of the frame responders via a bus 232, e.g., an Ethernet bus. Central office 1 206 also can include self-test equipment 233 coupled to the central office switch 218 and the bus 232.

Central office 2 208 includes a central office switch 234 and a plurality of DATU EXPs, DATU EXP 1 236, DATU EXP 2 238, DATU EXP n 240. The DATU EXP is an updated version of the DATU including an Ethernet interface. Within central office 2 208, each DATU EXP 236, 238, 240 is coupled to central office switch 234 via a no test trunk device 242, 244, 246, respectively. Central office 2 208 also can include a secure interface 239 coupled to each of the DATU EXPs 236, 238, 240 via a bus 248, e.g., an Ethernet bus. Central office 2 208 also can include self-test equipment 247 coupled to the central office switch 234 and the bus 248.

Databases 210 include a plurality of databases including information accessed, used, and/or stored by the voice interface unit 202. Databases 210 includes information associating subscriber line phone numbers with specific central offices and specific line conditioning devices which may be used on each subscriber's POTS line. Databases 210 may include databases which take into account and include line number portability information; such databases may be used to automatically determine a subscriber's corresponding line conditioning unit. In at least one exemplary embodiment the database 210 includes information that associates one or a group of telephone numbers with a line conditioning unit, e.g., line conditioning unit identification information. Line conditioning unit information associated with a telephone number may include a telephone number, Ethernet interface, MAC address, IP address, and/or other information which may be used to access the line conditioning unit associated with a particular telephone number. In some embodiments, database 210 includes line number portability information, said line number portability information associating at least one telephone number including an area code corresponding to a first geographic area with a line conditioning unit corresponding to a second geographic area to which said at least one telephone number has been ported. Thus, the correct line conditioning unit will be automatically identified and accessed even in the case where a line corresponding to a ported telephone number is to be tested.

Databases 210 also include Voice Interface Unit system equipment information, current system status information, technician records information, usage records information, results logs information, security information, fault information, and site/equipment personnel contact information. Databases 210 may be a composite of function specific databases and may be located at one or multiple sites. Each database in databases 210 includes a secure interface 250. Similarly, application servers 212 may include multiple function specific application servers, e.g., a security server, a usage records retention server, etc; multiple servers may be located at multiple sites. Each application server in applications servers 212 includes a secure interface 252. VIU secure interface 216 is coupled to the server/firewall 204. The server/firewall 204 is also coupled to secure interfaces 231, 239, 250, and 252 via bus 254. Secure interfaces 216, 250, 252, and server/firewall 204 provide secure access to the operations network with secure-shell and encrypted application-to application login. Secure interfaces 216, 231, 239 and server/firewall 204 provide fully asynchronous operational capability between the Voice Interface Unit 202 and the frame responders 220, 222, 224/DATU-EXPs 236, 238, 240, e.g., using telnet/secure shell interface. This allows the telnet applications to communicate with the secure interface 216 application on the voice interface unit 202, asynchronously as soon as relevant operations are executed on the line conditioning device.

In some embodiments, the Voice Interface Unit 202, server/firewall 204, databases 210, and/or application servers 212 may be located at one of the central offices 206, 208 of system 200.

FIG. 2 also includes a first subscriber communication device 256, e.g., a first telephone, a first field service technician 258, a first field service technician first communications device 260, e.g., a second telephone, and a first field service technician second communications device 262, e.g., a first personal computer (PC), and test equipment 264.

First subscriber communications device 256 is coupled to central office switch 218 via a first POTS line 266, e.g., a copper line wire pair. POTS line 266 is the line that technician 258 is servicing. First field service technician communications device 260 is coupled to VIU user interface 214 via a second path 268, e.g., a second POTS line and/or cell phone link. Second field service technician communications device 262 is coupled to VIU user interface 214 via another path 270, e.g., POTS line and/or cell phone link. Third POTS line 272 couples central office switch 218 to user interface 214. It is to be understood that line 268 and/or line 270 may transverse one or more central offices, wireless base stations, routers, and/or switches in their route between communication device 260, 262 and user interface 214. In some embodiments, the communication devices 260, 262 may be wireless communication devices, e.g., cell phones and/or wireless terminals. In such embodiments, part of the path represented by dashed lines 268, 270 shall be a wireless link, and the signaling shall pass through a base station. In some embodiments, device 262 shall be a terminal located at a central office or technician garage. Test Equipment 264 may include ohmmeters, voltmeters meters, oscilloscopes, signal detection devices, signal recording devices, etc.

The field service technician 258 may need to service POTS line 266. Field service technician 258 may access and control an appropriate line conditioning device through the VIU 202 using the user interface 214. The request and control for a line conditioner may be directed through any of the communications devices 256, 260, 262. The user interface 214 provides a voice input/output capability for communications devices 256, 260 and a Web based input/output capability for communications device 262. In cases, where the call originates from first subscriber communications device 256, the user request signals and VIU to user response signals may be routed over POTS lines 266, 272 to the VIU user interface 214; in such a case, after inputting the request for conditioning the user may hang-up and disconnect from the VIU resulting in an on-hook condition for line 266. In such a case, the VIU processes the conditioning request, resulting in an appropriate line conditioning device connecting to line 266, performing a call-back operation and conditioning the line as requested. In cases where the conditioning requests are input through a line other than the one to be conditioned, e.g., through communications device (260, 262), the technician may remain on the line (268, 270) connected to the VIU during conditioning. After the line 266 has been conditioned, the technician 258 may perform a specified test, e.g., check the line 266 for the presence, strength, and/or SNR of a test signal using test equipment 264.

FIG. 2 also includes a second subscriber communication device 274, e.g., a third telephone, a second field service technician 276, second field service technician second communications device 278, e.g., a fourth telephone, and a second field service technician second communications device 280, e.g., a second personal computer (PC), and test equipment 282.

Second subscriber communications device 274 is coupled to central office switch 234 via a fourth POTS line 284, e.g., a copper line wire pair. POTS line 284 is the line that technician 276 is servicing. Second field service technician communications device 278 is coupled to VIU user interface 214 via a second path 286, e.g., a fifth POTS line and/or cell phone link. Second field service technician communications device 280 is coupled to VIU user interface 214 via another path 288, e.g., a POTS line and/or cell phone link. Sixth POTS line 290 couples central office switch 234 to user interface 214. It is to be understood that line 286 and/or the line 288 may transverse one or more central offices, wireless base stations, routers, and/or switches in their route between communication device 278, 280 and user interface 214. In some embodiments, the communication devices 278, 280 may be wireless communication devices, e.g., cell phones and/or wireless terminals. In such embodiments, pair of the path represented by dashed lines 286, 288 shall be a wireless link, and the signaling shall pass through a base station. Test Equipment 282 may include ohmmeters, voltmeters meters, oscilloscopes, signal detection devices, signal recording devices, etc.

The field service technician 276 may need to service POTS line 284. Field service technician 276 may access and control an appropriate line conditioning device through the voice interface unit 202 using the user interface 214. The request and control for a line conditioner may be directed through any of the communications devices 274, 278, 280. The user interface 214 provides a voice input/output capability for communications devices 274, 278 and a Web based input/output capability for communications device 280. In cases, where the call originates from second subscriber communications device 274, the user request and VIU response signals may be routed over POTS lines 284, 290 to the voice portal user interface 214; in such a case, after inputting the request for conditioning, the user may hang-up and disconnect from the VIU resulting in an on-hook condition for line 284. In such a case, the VIU processes the conditioning request, resulting in an appropriate line conditioning device connecting to line 284, performing a call-back operation, and conditioning the line as requested. In cases, where the conditioning requests are input through a line other than the one to be conditioned, e.g., through communications device (278, 280), the technician 276 may remain on the line (286, 288) connected to the VIU during conditioning. After the line 284 has been conditioned, the technician 276 may perform a specified test, e.g., check the line 284 for the presence, strength, and/or SNR of a test signal or use shorts or opens to perform other tests using test equipment 282.

Self-Test equipment 233, 247 can provide a means for a user of the Voice Interface Unit system to perform self-tests of the voice interface unit equipment, e.g., line conditioners 220, 236, user interfaces 214, etc. The interface between the VIU and the Frame Responder may use TCP/IP. The self tests can use ping, trace route plus sophisticated software to determine what caused the problem.

The number of central offices accessible by the VIU may be substantially greater than the two of the exemplary system in FIG. 2, in accordance with the invention. In addition, the VIU system, in accordance with the invention may include central offices each employing a mixture of line conditioning devices of various manufactures and/or models.

Figure 3:
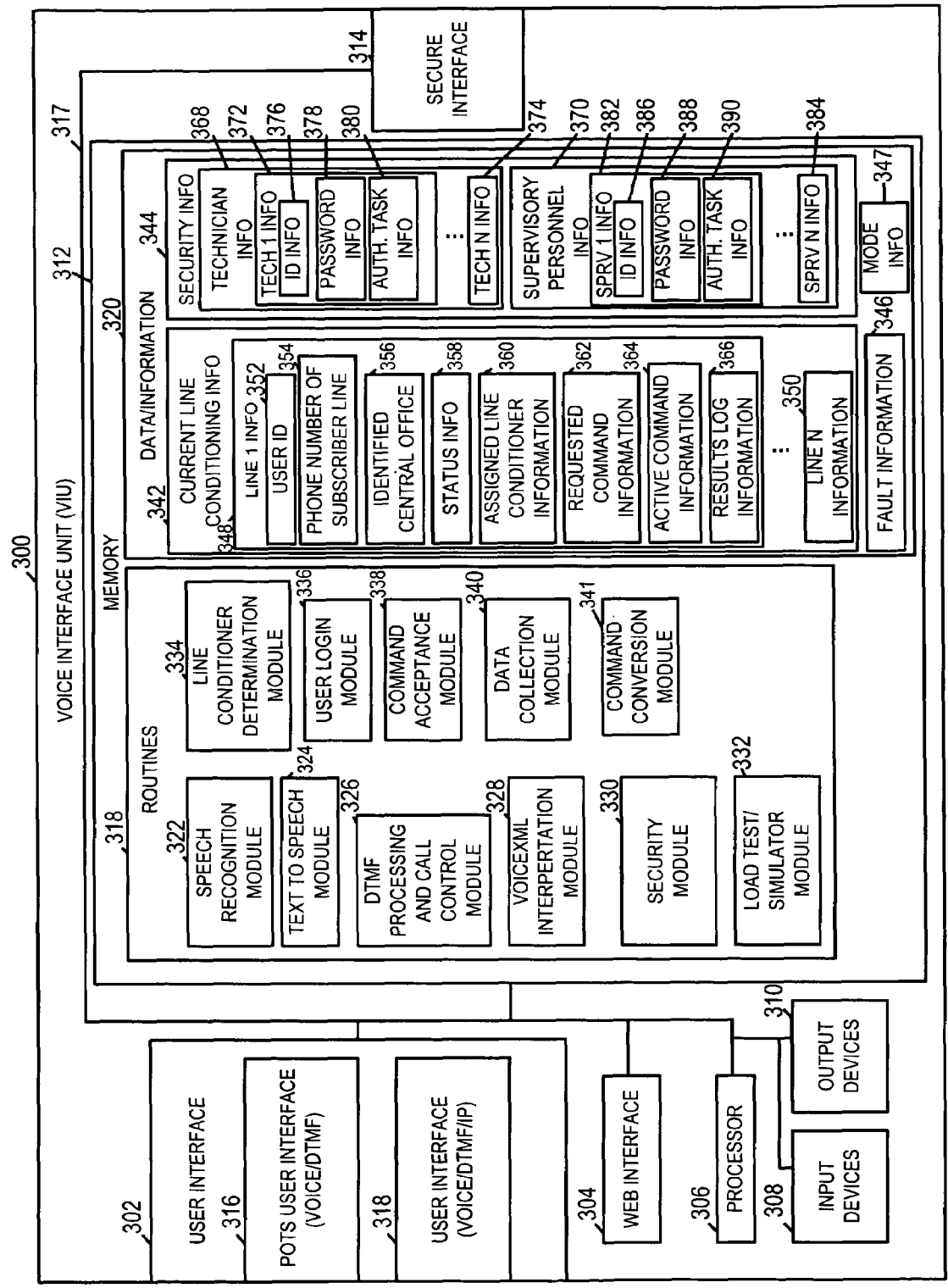
FIG. 3 is a more detailed representation of an exemplary voice interface unit implemented in accordance with the present invention.
Figure 4A:
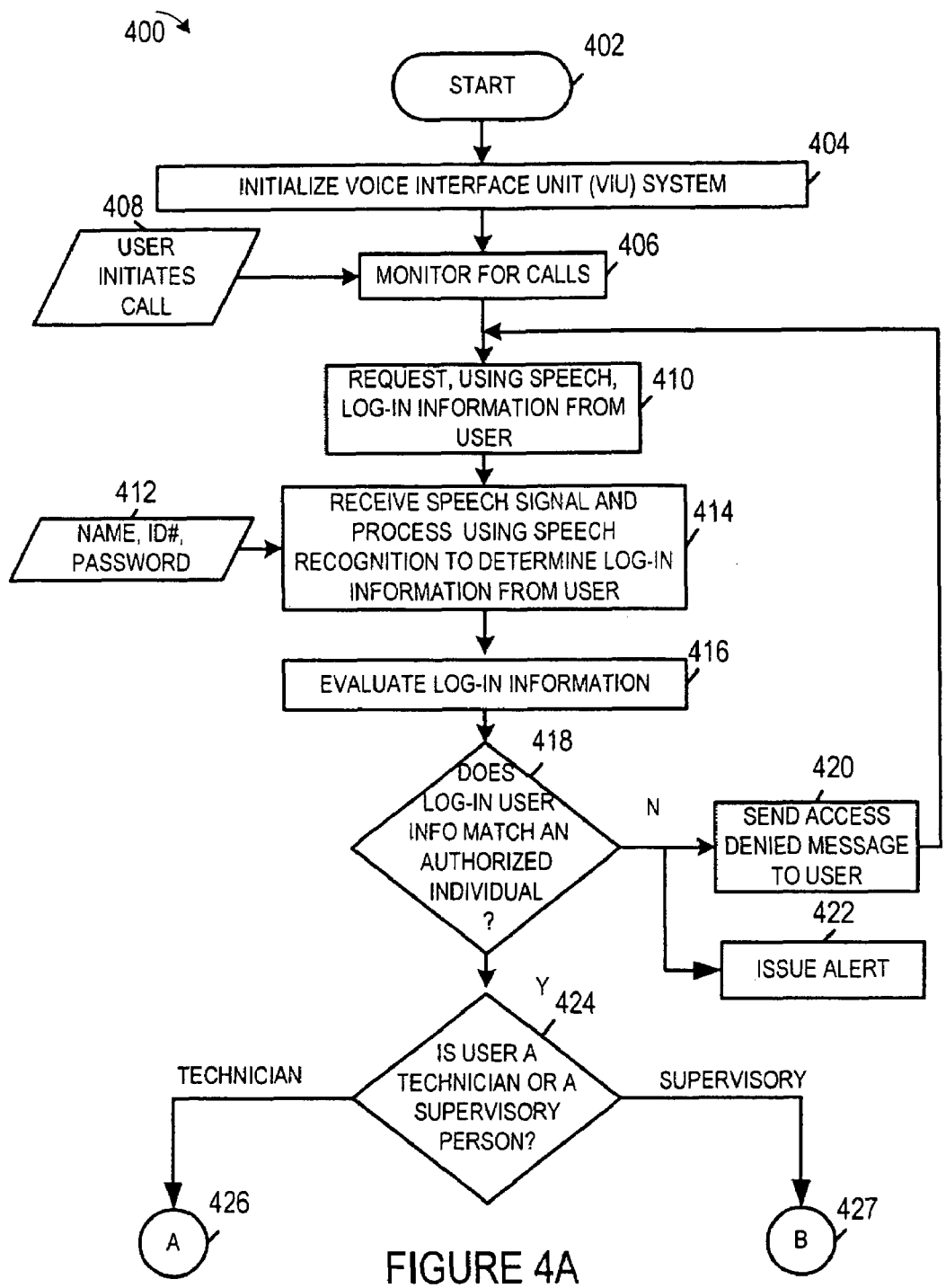
FIG. 4 is a flowchart of an exemplary method of operating an exemplary centralized voice interface unit system including accessing and controlling POTS line conditioners in accordance with the present invention.
Figure 4B:
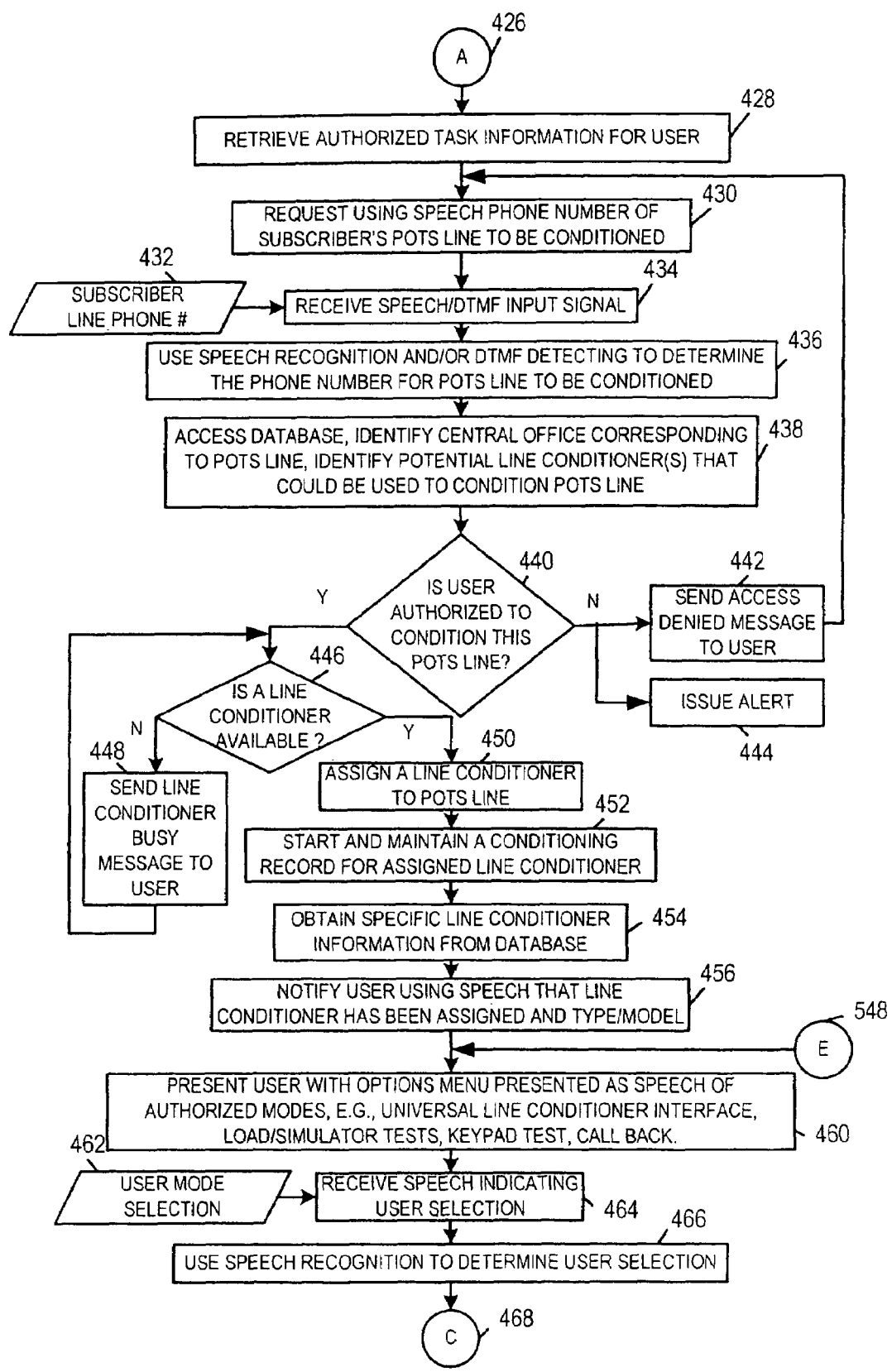
Figure 4C:
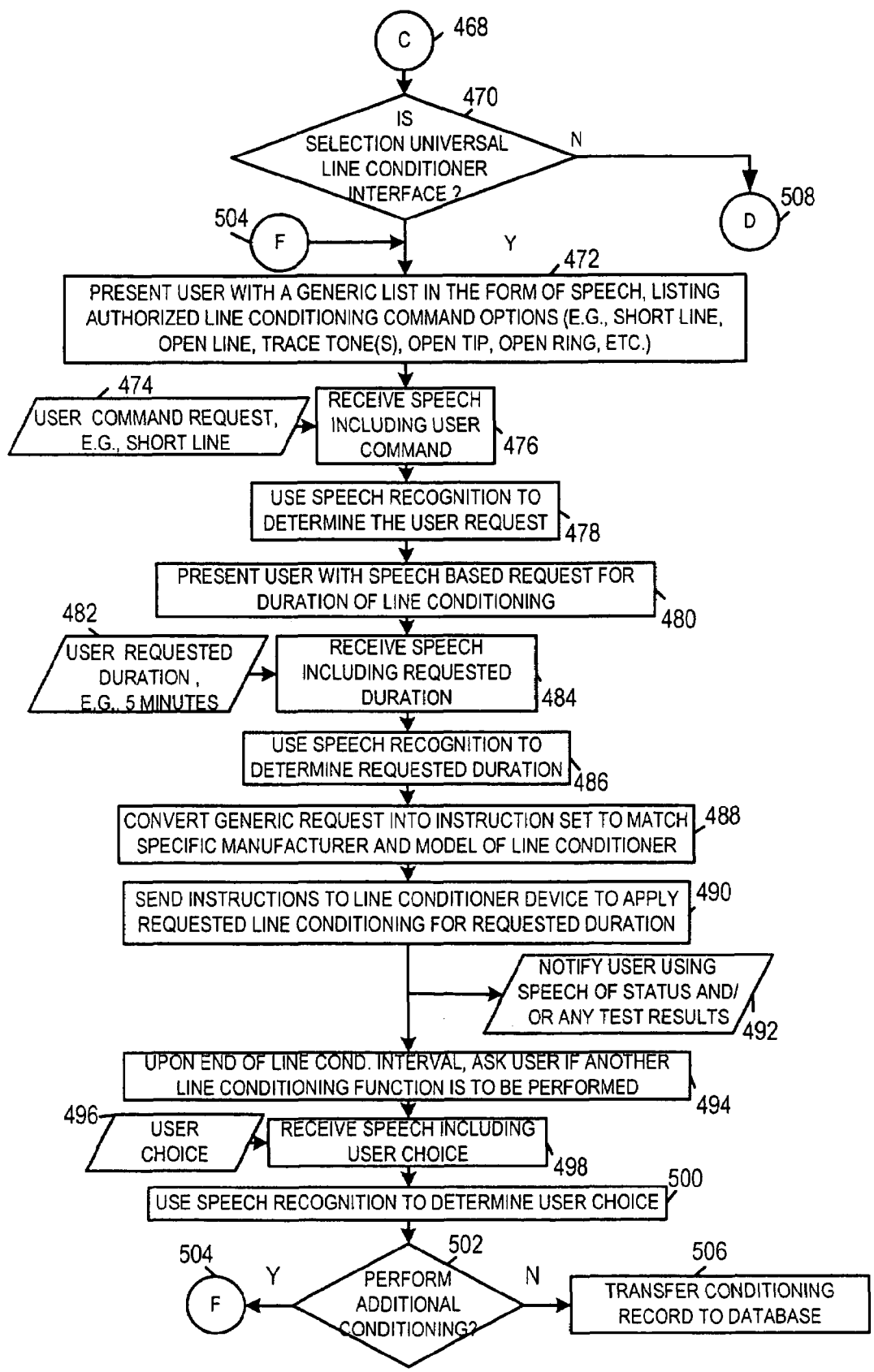
Figure 4D:
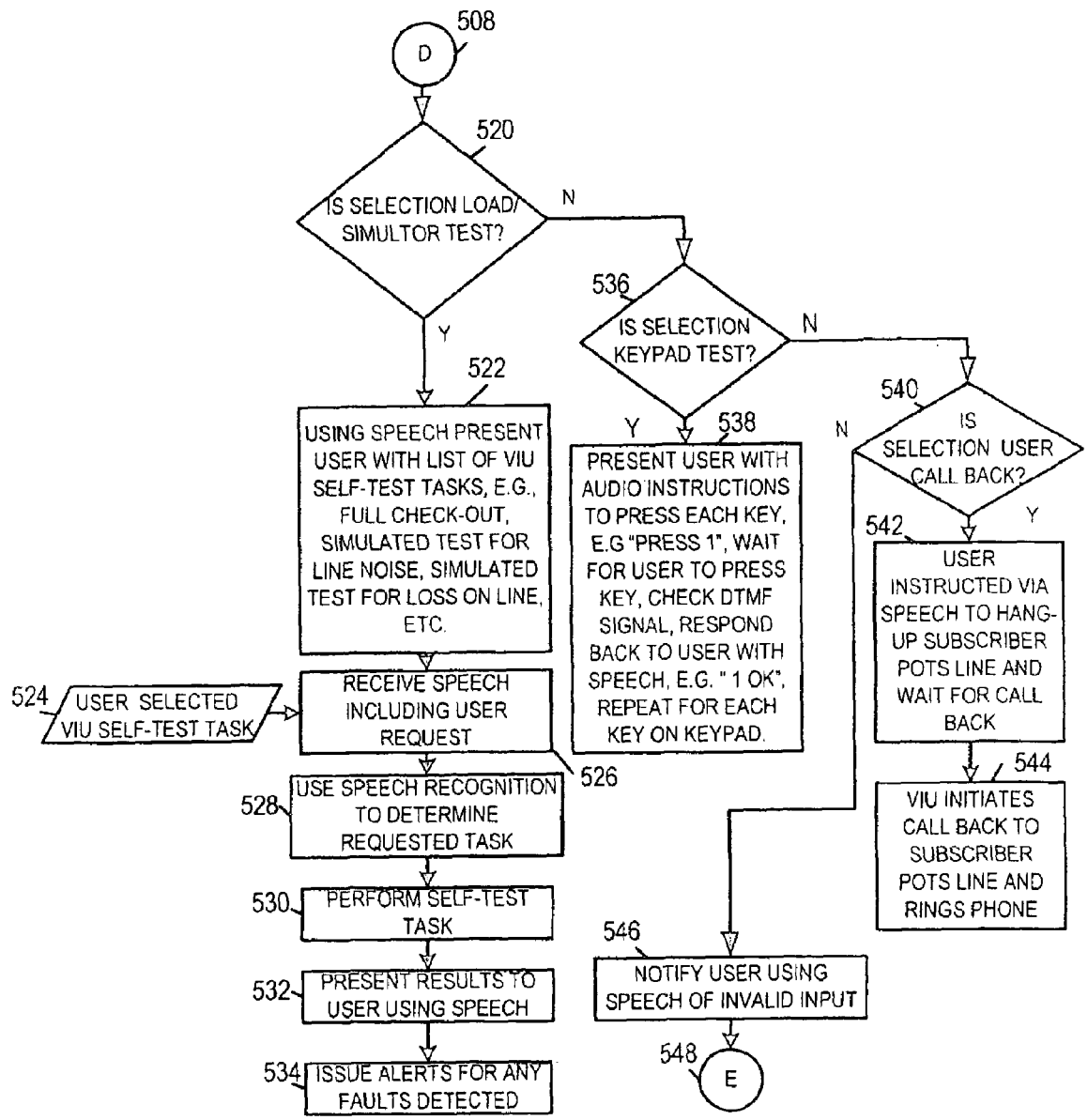
Figure 4E:
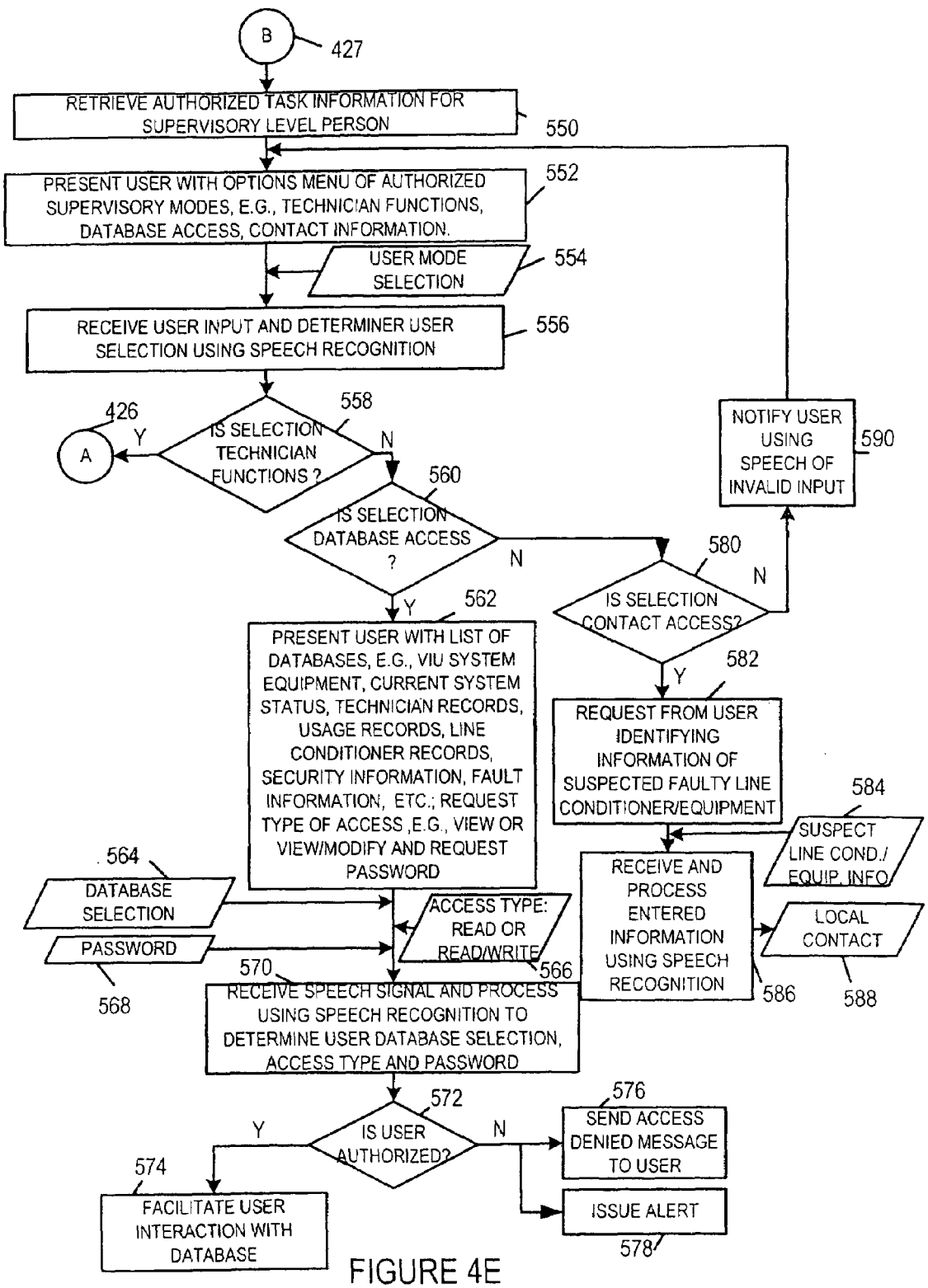

FIG. 3 is an illustration of an exemplary voice interface unit (VIU) 300 implemented in accordance with the present invention. Exemplary voice interface unit 300 may be a more detailed representation of the voice interface unit 202 of FIG. 2. Voice interface unit 300 includes a user interface 302, a web interface 304, a processor 306, input devices 308, output devices 310, a memory 312, and a secure interface 314 coupled together via a bus 317 over which the various elements may interchange data and information. User interface 302 provides an interface through which users, e.g., field service technicians and supervisory personnel, may log-in, request connection of a specific POTS line to an appropriate line conditioning device, request specific line conditioning functions and/or tests, receive status/results information on line conditioning performed, and request disconnect of a POTS line. User interface 302 includes a POTS user interface 316 and an intranet user interface 318. POTS user interface 316 provides a voice/DTMF interface capability to users operating over POTS lines, e.g., from a telephone through a central office switch(s). Intranet user interface 318 provides an IP interface capability to users operating over an Intranet line, e.g., from a computer communicating through a modem via a TCP/IP link through a central office. Intranet interface 318 communicates and exchanges data information with web interface 304.

Web interface 304 also allows ease of insertion, modification, and deletion of the line conditioner database information. This allows the voice interface unit system to be updated as the system is modified, e.g., when new equipment, e.g., a new model frame responder is brought on-line, as old equipment is removed, as failures occur within the system, etc. In addition, web interface 304 provides access information used to contact the proper supervisory personnel to locally access, test and repair line conditioners or other components within the voice interface unit control system, when problems occur.

In some embodiments, certain modes of operation of the Voice Interface Unit, e.g., database update, shall be accessible through the Web interface, e.g., using IP, but not accessible through the voice/DTMF input/output capabilities. In some embodiments, certain modes of operation, e.g. database updates shall be restricted to supervisory level personnel.

Processor 306, e.g., a CPU, executes routines and uses data/information in memory 312 to operate the voice interface unit 300 and implement the methods of the present invention. Input devices 308 include keyboards, keypads, mouse controllers, touch-tone screens, microphones, etc. Input devices 308 allow an operator of the voice interface unit 300 to request various display functions, e.g., display current status of each of the line conditioner, display POTS lines currently under test, display statistical information relating to testing. Updates to the VIU system may also be entered through input devices 308. Output devices 310 include devices such as displays, monitors, printouts, speakers, alarms, etc. Output devices 310 output information such as listings of failed equipment, e.g., failed line conditioners, listings of POTS line under test, listings of technicians and supervisory personnel logged-in to the system, and warning of unauthorized attempted access to the system.

Memory 312 includes routines 318 and data/information 320. Routines 318 include a speech recognition module 322, a text to speech module 324, a DTMF processing and call control module 326, a voiceXML interpretation module 328, a security module 330, a load test/simulator module 332, a line conditioner determination module 334, a user log-in module 336, a command acceptance module 338, a data collection module 340, and a command conversion module 341.

Data/information 320 includes current line conditioning information 342, security information 344, fault information 346, and mode information 347. Current line conditioning information includes a plurality of sets of line conditioning information corresponding to a plurality of POTS lines for which conditioning has been requested, e.g., line 1 information 348, line N information 350. Line conditioning information set 1 348 includes user identification (ID) 352, a phone number of subscriber line 354, an identified central office 356, status information 358, assigned line conditioner information 360, requested command information 362, active command information 364, and results log information 366. Security information 344 includes technician security information 368 and supervisory personnel security information 370. Technician information 368 includes a plurality of sets of information corresponding to the technicians who are authorized to access the voice interface unit 300, e.g., technician 1 security information 372, technician N security information 374. Technician 1 security information 372 includes identification information 376, password information 378, and authorized task information 380. Supervisory personnel security information 370 includes a plurality of sets of information corresponding to the supervisory personnel who are authorized to access the voice interface unit 300, e.g., supervisory person 1 information 382, supervisory person N information 384. Supervisory personnel 1 information 382 includes identification information 386, password information 388, and authorized task information 390.

User ID 352 includes the name and company identification number of the logged-in technician or supervisory level person requesting access to the voice interface unit 300. Phone number of subscriber line 354 is the phone number corresponding to the POTS line to be conditioned. The phone number of the subscribed line 354 may be input from the user, e.g., technician. Alternately, if the user is calling the Voice Interface Unit 300 from the POTS line to be conditioned, and so indicates, the Voice Interface Unit 300 may user caller identification, if available, to determine the phone number of the subscriber line 354. Identified central office 356 is the central office corresponding to the POTS line to be conditioned. Status information 358 is the current status of the user request, e.g., line conditioning device presently unavailable, line conditioning device has been allocated, POTS line conditioning in progress, etc. Assigned line conditioner information 360 is identification information corresponding to specific line conditioning device, e.g., manufacturer, type, model, S/N, phone number, slot number, etc., which has been assigned by the voice interface unit for the POTS line. Requested command information 362 includes information indicating user requested: line conditioning commands, sequences of line conditioning commands, durations of line conditioning events, line tests, automated functions, etc. Active command information 364 includes information indicating the current line conditioning command being executed and duration, e.g., low level tone active, 3 minutes of a 7 minutes conditioning interval remain. Results log information 366 includes information summarizing line conditioning requested and performed on the POTS line as well as any specific test results recorded by the voice interface unit, e.g., a time tagged summary of a session of events pertaining to the POTS line including user ID 352, phone number of subscriber line 354, and assigned line conditioner information 360. Results log information 366 may be transferred to a database 210 when the user relinquishes the assigned line conditioning device.

Technician 1 security information 372 includes identity information 376, e.g., a name and/or company employee number. Identity information 376 also includes data used to characterize technician 1's voice, e.g., a frequency spectrum model used for verification. Password information 378 includes a specific password and/or PIN (personal identification number) unique to technician number 1 and used for verification. Biometric information can be also used to verify technician identity e.g., fingerprint readers and retinal scanners.

Authorized task information 380 includes a subset of the modes and functions available at the voice interface unit, the subset listing the modes and functions for which commands may be accepted. Different technicians may be allowed different level of access. For example, certain technicians may be restricted from using certain emulation modes, e.g., because they do not have the proper training or equipment. Authorized task information 380 also includes information limiting specific technicians to performing line conditioning corresponding to POTS lines in specific regions, e.g., an assigned work zone.

Supervisory person 1 security information 382 includes identity information 386, e.g., a name and/or company employee number. Identity information 386 also includes data used to characterize supervisory person 1's voice, e.g., a frequency spectrum model used for verification. Password information 388 includes a specific password and/or PIN (personal identification number) unique to supervisory person 1 and used for verification. In addition, password information 388 may include additional specific passwords and/or access numbers for each individual supervisory level function, task and/or mode available at the voice interface unit 300.

Authorized task information 390 includes a subset of the modes and functions available at the voice interface unit 300, the subset listing the modes and functions for which commands may be accepted for supervisory person 1. Different supervisory personnel may be allowed different level of access. For example, certain supervisory persons may be allowed to update security information of technicians, while other supervisory persons may be allowed to access databases listing line conditioning devices, while still other supervisory personnel may be allowed to update database listings of line conditioning devices. Authorized task information 390 also includes information limiting specific supervisory personnel to specific regions, e.g., a supervisory person may be allowed to update the database of equipment at one central office while being restricted from accessing any information corresponding to another central office.

Fault indication information 346 includes information identifying inoperative devices and/or modules within those devices in the communications system, e.g., defective no test trunk device, defective line conditioning devices, defective portions of central office switches, etc. Fault indication information 346 also includes suspected faults reported from field service technicians such as, e.g., suspected open POTS line between central office and subscriber phone, suspected short between two subscriber's POTS lines, etc. Such fault indication information 346 may be used to alert other service personnel to take appropriate action, e.g., replace a defective line conditioning device, replace a severed POTS line, etc.

Mode information 347 includes a number of operating modes of the voice portal frame responder 300. Mode information 347 includes both technician level mode information and supervisory level mode information.

Various exemplary operating modes available to technicians include a universal line conditioner interface mode, a load/simulator test mode, a keypad test mode, and a user call back mode. The universal line conditioner test interface uses a universal set of voice input commands/voice output prompts/instructions/responses to communicate with a user, regardless of the specific manufacturer, type, and/or model of line conditioner. This universal line conditioner test interface mode provides a transparent or nearly transparent communication interface to the user. In some embodiments, this universal interface is tailored automatically to account for slight differences, features, and limitations of the variety of possible line conditioning devices which may be employed at the central office.

The load/simulator test mode allows the user to check out the operation of the voice interface unit system and identify faults, e.g., an inoperative frame responder. The load simulator mode also allows the user to obtain baseline test data and measurements in a controlled environment with controlled loads simulating a specific test, e.g., a power loss check. Data obtained in the load/simulator test mode may be used by a VIU developer to expedite troubleshooting of the VIU interface. A keypad test mode allows a technician to test and evaluate a subscriber's phone output for proper DTMF signaling. The user call back mode allows the technician to direct the voice interface unit to call back and ring a line. This also can be used to verify the operation of Caller Id service for the subscriber.

A number of supervisory level modes also exist, e.g., a technician functions mode, a database access mode, and a contact information mode. The technician functions mode allows a supervisor to conduct operations that a technician normally performs. The database access mode allows the supervisory person, with proper authorization, to access and/or update various databases, e.g., VIU equipment databases, security databases, etc. The contact information mode allows a supervisory person to gain contact information and/or automatically contact the appropriate local site specific personnel responsible for maintaining, troubleshooting, repairing, and/or testing a specific device identified as having a potential fault, e.g., a specific frame responder at a specific central office.

Speech recognition module 322 accepts signals from user interfaces 316, 318 and processes the signals to determine the voice/DTMF input information. Such voice and/or DTMF input from a user, e.g., a field service technician, includes user ID information 352, phone number of subscriber line 354, and, requested mode information 327, requested command information 362. The voice input signals are processed into information and commands that may be recognized and used by the various routines 318. Text to speech module 324 generates speech menus, messages, instructions, etc. which are sent to the user as audible signals via user interfaces 316, 318. Speech menus may include log-in prompts, mode prompts, line conditioning selection prompts, and prompts for log entry information. Messages may include acks/naks to requested commands, status updates, e.g., "Open line command conditioning in progress". Instructions generated by text to speech module include instructions directing the user to attach a test device and/or perform a specific measurement relevant to the type of line conditioning in progress.

DTMF processing and call control module 326 supports DTMF signaling control functions. In some embodiments, the voice interface unit 300 supports emulation modes of known DTMF line conditioner command sets, e.g., emulation of the Harris DATU EXP DTMF input, emulation of the CMC Frame Responder DTMF input/output. It may be beneficial, e.g., for security purposes, for the user to enter and the VIU to process some DTMF signaling in addition to voice, e.g., DTMF signals entered for passwords/PINs. VXML (Voice Extensible Mark-up Language) interpretation module 328 supports communications using VXML 2.0 service creation language. Security module 330 controls user access to the voice interface unit 300 using the security information 344. Security module 330 also generates alerts for unauthorized access attempts. Security module 330 controls the secure interface 314 and performs encryption functions, thus providing for the secure exchange of data and information through server firewall 204 to databases 210, application servers 212, line conditioning devices 220, 222, 224, 236, 238, 240, and/or optional self-test equipment 233, 247.

Load/test simulator module 332, when evoked, automatically performs many of the line conditioning and testing functions that a real user, e.g., a field service technician, would perform on a subscriber's POTS line to be conditioned and tested. Load/test simulator module 332 can control the connection of self-test equipment 233, 247, e.g., dummy loads, measuring instrumentation, etc. to a selected line conditioning device in a central office through a central office switch via a no test trunk device. Load/test simulator module 332 commands dummy load connections, commands test equipment set-ups, generates line conditioning commands, e.g., via simulated voice commands and/or DTMF signals directed to the input of user interface 302, receives measured responses, and evaluates measured responses. Thus load/test simulator module 332 simulating technician line conditioning voice/DTMF commands over the voice portal frame responder under well controlled conditions, effectively performs end-to-end self-tests of the voice interface unit testing system. The load/test simulator module 332 by comparing results against expected results may isolate faults, e.g., a problem with a load conditioner, a problem with a voice interface, etc. In addition, results obtained by the load/test simulator module 332 may be conveyed to a field service technician via the user interface 302 to be used for comparison purposes against test results corresponding to a subscriber's POTS line which the technician is troubleshooting.

In some embodiments, load/test simulator module 332 may perform tests on a periodic basis without user intervention. In some embodiments, users, e.g., technicians may select to perform specific tests and/or obtain the results of those tests.

Line conditioner determination module 334 uses the phone number of the subscriber POTS line to be conditioned 354, accesses information in databases 210 to identify the central office 356 to which the subscriber's POTS line 266, 284 is connected, identifies an available line conditioner, assigns an available line conditioner, and obtains assigned line conditioner information 360 from databases 210. Line conditioner determination module 334 eliminates the need for the field service technician to determine which POTS lines are associated with which central offices, line conditioning devices, phone numbers, and/or passwords. In addition, if one line conditioner is unavailable, line conditioner determination module 334 can automatically switch to another line conditioner without requiring user intervention. In contrast, in many known systems, if a user calls a first line conditioner and it is unavailable, the user may have to terminate the call and place a second call to a second potential line conditioner.

User log-in module 336 controls the user interface 302 and web interface 304 by using the security information 344 to log-in technicians and supervisory personnel. The web interface is accessed by the user requesting the proper url on the intranet. The user may log-in to the VIU user interface by dialing a central number corresponding to the voice portal frame responder 300, e.g., a 1-800 number. The user log-in module 336 asks the user to enter user name and password. Only if the an acceptable input is received, e.g., an input which matches information included in security information 344 will the VIU allow operation to proceed to the command acceptance module 338. If improper user input is received a warning message may be transmitted to the user. Improper log-ins generate alerts to the security module 330. In some embodiments, improper log-ins are filtered before the security module is notified.

Command acceptance module 338 accepts and processes user requested commands, e.g., commands for a specific mode of operation, and/or commands for a specific function or task. Operation is transferred to the command acceptance module if the log-in module admits a user. The command acceptance module 338 in coordination with the security module 330 restricts command menus and command acceptance based on security information 344. The command acceptance module 338 operation includes forwarding accepted commands to the command conversion module 341.

The command conversion module 341 converts accepted commands to the correct format corresponding to the specific assigned line conditioning device at the pertinent central office. The command conversion module 341 uses the assigned line conditioner information 360 to determine the vendor and/or model of the line conditioner. Then, the command conversion module 341 can reformat the commands, e.g., change the protocol of the signaling instructions to the line conditioner, to match the particular device. Similarly, signals received from a line conditioner using its unique protocol may be reformatted into a universal set of messages in a format acceptable to the text to speech module, so that universal voice format messages may be conveyed to the user. In addition, the command conversion module 341 generates control and information signaling corresponding to the various unique modes of operation, e.g., emulation modes, keypad mode, call-back mode, database access mode, contact mode, etc.

FIG. 4 illustrates an exemplary method of operating an exemplary centralized voice interface unit system including accessing and controlling POTS line conditioners in accordance with the present invention. Operation starts at node 402 and proceeds to initialization step 404. In step 404, the voice interface unit (VIU) system is powered on and initialized. Communications are established between the VIU 202 (300), central offices 206, 208, applications servers 212, and databases 210. Current security information 344 and/or fault information 346 may be downloaded into the VIU from databases 210.

In step 406, the VIU monitors for calls, e.g., to its assigned 1-800 number. A user, e.g., a technician or supervisory level person, initiates a call as indicated by input 408. In step 410, in response to the received call, the VIU requests, using speech generated under the direction of text to speech module 324, log-in information from the user. Input 412 from the user such as name, identification number and password is received in step 414 by the user interface 302 of the VIU as received speech signals; the speech recognition module 322 processes the signals to determine log-in information from the user. Next in step 416, the user log-in information is evaluated by the user log-in module 336, e.g., compared against security information 344. In step 418 the user log-in module 366 checks if the user information received in step 414 matches an authorized individual. If a match is not found, operation proceeds to step 420 and step 422. In step 420, the VIU generates and sends an access denied voice message to the user and returns operation to step 410 requesting that the user repeat the log-in. In step 422, the log-in module 336 issues a warning alert to the security module 330 providing notification and information of the failed access attempt. However, if the log-in information received in step 414 matched an authorized user, operation proceeds from step 418 to step 424. In step 424, the user-log-in module 336 determines whether the accepted user has been classified as a technician or a supervisory level person. If the accepted user has been classified as a technician, operation proceeds from step 424 to step 428 via connecting node A 426. If the accepted user has been classified as a supervisory level person, operation proceeds from step 424 to step 550 via connecting node B 427.

In step 428, the log-in module 336 retrieves authorized task information for the user, e.g., tech 1 authorized task info 380. In step 430, the VIU requests through user interface 302, using speech generated by text to speech module 324, the phone number of the POTS line to be conditioned. The user, e.g., technician, inputs the subscriber's line phone number 432 corresponding to the line to be conditioned. In step 434, the VIU receives the speech/DTMF input signal through user interface 302. Next, in step 436, the VIU uses modules 322 and/or 326 to perform speech recognition and/or DTMF detecting to determine the phone number for the POTS line to be conditioned. The determined number of the POTS line to be conditioned is stored in memory 320, e.g., as line 1 phone number of subscriber line 354. In step 438, the VIU line conditioner determination module 334 accesses database 210 and uses the phone number of the POTS line to be conditioned to identify the central office corresponding to the POTS line, e.g., line 1 identified central office 356. Line conditioner determination module 334 also determines the potential line conditioner(s) at that identified central office that could be used to condition the POTS line of interest.

Next, in step 440, security module 330 uses the identified central office and security information to determine if the user is authorized to condition the POTS line of interest, e.g., each individual technicians may be assigned to a service region and may be restricted to conditioning POTS lines corresponding to a set of central offices in their own region. In step 440, if it is determined that the user should not be allowed to condition the requested POTS line, operation proceeds to steps 442 and 444. In step 442, the security module 330 notifies the text to speech module 324 to generate an access denied message and send the voice signal over the user interface 302 to the user. Operation proceeds from step 442 back to step 430 where the user is prompted again for the phone number of the POTS line to be conditioned. In step 444, the security module 330 issues an alert, e.g., sends messages and information to results log 366 regarding the failed access attempt and could also notify the systems administrator via page or email.

However, in step 440, if it was determined that the user is authorized to condition the POTS line of interest, operation proceeds to step 446. In step 446, line conditioner determination module 334 checks if one of the potential line conditioners identified in step 438 is available. If a line conditioner is not available, operation proceeds to step 448. In step 448, the text to speech module 324 generates a voice message indicating that line conditioners are busy. The voice message is sent over user interface 202 to the user, e.g., technician. Alternatively, a busy signal could be generated and sent to the user. Operation proceeds from step 448 back to step 446 where the availability of a line conditioner is again checked.

If the check of step 446 determines that a line conditioner is available, operation proceeds to step 450. In step 450, the line conditioner determination module 334 assigns a line conditioner to the POTS line of interest and stores information identifying the line conditioner, e.g., in line 1 assigned line conditioner information 360. Next, in step 452, the data collection module 340 starts and maintains a record for the assigned line conditioner, e.g., line 1 results log information 366 While a separate results log is shown for each line, a single results log for all lines can, and in some embodiments is used. Thus information about multiple line can be obtained from a single file In step 454, the line conditioner determination module 334 obtains specific manufacturer, model, type, S/N, etc. line conditioner identification and operational information from databases 210 and stores the information, e.g., in line 1 assigned line conditioner information 360. Next, in step 456, the user is notified using speech that the line conditioner has been assigned. In some embodiments, the user is also notified of the type/model of line conditioner. In step 460, the text to speech module 324 generates signals to user interface 302, and the user is presented with an options menu, presented as speech, of authorized modes, e.g., universal line conditioner interface, emulation interface, load/simulator test, keypad test, call back.

In some embodiments, various modes of operation may be combined into a single voice command menu, e.g., allowing the user to request from one menu various line conditioning options, a call back function, and a keypad test. The user indicates mode selection via speech input 462; the speech input signal mode selection is received over user interface 302 in step 464. In step 466, the speech recognition module 466 determines the user selection. Operation proceeds from step 466 to step 470 via connecting node C 468.

In step 470, the command acceptance module 338 checks if the selection is for the universal line conditioner interface mode. If the selection is for the universal line conditioner mode, operation proceeds to step 472, otherwise operation proceeds to step 520 via connecting node D 508.

In step 472, text to speech module 324 generates signaling for a menu, and the user is presented with a generic list, in the form of speech, listing authorized line conditioning command options, e.g., short line, open line, trace tone(s), open tip, open ring, etc. Also command options including various sequences of line conditioning commands are possible and may be presented in accordance with the invention. The user pronounces a command request 474, e.g., short line. The user interface 302 receives the speech signal including the user command in step 476. In step 478, the speech recognition module 322 determines the user request, stores the information, e.g., in line 1 requested command information 362, and forwards the request to the command acceptance module 338. In step 480, the user is presented with a speech based request for the duration to apply the line conditioning command to the POTS line. The user responds with a user requested duration, e.g. 5 minutes, as input 482. In step 484, the speech input 482 including requested duration is received over VIU user interface 302. Next, in step 486, the speech recognition module 322 determines the requested duration, stores the information in requested command information 362, and forwards the information to the command acceptance module 338. In step 488, the command acceptance module interfaces with the command conversion module 341. The command conversion module 341 converts the generic request into instructions of the instruction set matching the specific manufacturer and model for the assigned line conditioner. Conversions may involve changes in format, changes in protocols, changes in programming languages, concatenation of instructions, etc. In step 490, the VIU sends the instructions to the assigned line conditioner device to apply the requested line conditioning for the requested duration. The instructions are sent to the line conditioner via secure interface 314 through firewall/server 204 and through a secure interface at the central office housing the assigned line conditioner. The line conditioning device applies the line conditioning to the POTS line, and the command is listed in active command information, e.g., line 1 active command information 364. In step 492, the user is notified using speech of status, e.g., line 1 status information 358 and/or any test results. An exemplary notification may be, e.g., "Short Line conditioning in progress—3 minutes remaining—operation normal." During the line conditioning duration, the user, e.g. technician, may attach test equipment to the POTS line and perform tests, checks, and/or measurements. Upon the end of the line conditioning duration, operation proceeds to step 494 in which the VIU asks the user via speech if another line conditioning function is to be performed. In step 498, the user interface 302 of the VIU receives speech including the user choice 496. In step 500, the speech recognition module 322 determines the user choice from the received speech. In step 502, the command acceptance module 338 routes operation to step 472 via connecting node F 504, if additional conditioning is requested; otherwise operation proceeds to step 506. In step 506, the data collection module 340 transfers the conditioning record, e.g., line 1 results log information 366 to a database 210, e.g., a service provider data warehouse.

Returning to step 470, if the user selection is not for a universal line conditioner mode interface, operation proceeds to step 520 via connecting node D 508. In step 520, if the selected mode is for load/simulator mode, operation proceeds to step 522, otherwise operation proceeds to step 536. In step 522, the user is presented, using speech, with a list of VIU self-test tasks, e.g., full check out, simulated test for line conditioner noise, simulated test for loss on line, etc. In step 526, the VIU user interface 302 receives speech including the user selected request 524, e.g., a specific VIU self-test task. In step 528, speech recognition module 322 determines the request task received in step 526. Next in step 530, the load test simulator module 332 controls operation of the VIU system to perform the requested task, e.g., sending control signaling to the self-test equipment and central office switch in the central office, sending input signaling to the VIU user interfaces 302, and receiving test result information from the self-test equipment. In step 532, the load/simulator test module 332 sends results information to the text to speech module 324, which generates speech and presents the results to the user via interface 302. Then, in step 534, the load/simulator test module 332, issues alters and makes entries in fault information 346 for any problems detected, e.g., a line conditioning device injecting excessive noise onto POTS lines.

Returning to step 520, if the selected mode is not load/simulator test mode, operation proceeds to step 536. In step 536, a check is performed by the command acceptance module 338 to determine if the selected mode is the keypad test mode. If the selected mode is the keypad test mode, operation proceeds to step 538, otherwise operation proceeds to step 540. In step 538, the user is presented with audio instructions via the text to speech module 324 to press each key, e.g., "press 1". The VIU waits for the user to press each key, and then DTMF module 326 checks the DTMF signal received. The VIU responds back to the user with an appropriate message, e.g., "1 OK" generated by the text to speech module. The process may be repeated for each key on the keypad.

If operation proceeds to step 540, the command acceptance module 338 determines if the selected mode is user call-back. If the selected mode was not user call-back, operation proceeds to step 546. In step 546, the user is notified using speech generated by the text to speech module 324, that the input was invalid. Operation proceeds from step 546 via connecting node E 548 to step 458 where the user is presented with the valid mode selection options available.

In step 540 if it is determined that the selected mode is the user call back mode, operation proceeds to step 542. In step 542, the user is instructed via speech to hang-up the subscriber's POTS line and wait for call back. In step 544, the VIU initiates call back to the subscriber's POTS line and attempts to ring the phone.

Returning to step 424, if it was determined that the accepted logged-in user was a supervisory level person, operation proceeds via connecting node B 427 to step 550.

In step 550, command acceptance module 338 retrieves authorized task information for the identified supervisory level person, e.g., supervisory individual 1 authorized task information 390. Next, in step 552, the user is presented using speech with an options menu of authorized supervisory modes, e.g., technician functions, database access, contact information. In step 556, the user mode selection input 554 is received by user interface 302, and the speech recognition module 322 determines the user selection. Next, in step 558 the command acceptance module, determines if the selection is for technician function. If the selection is for technician functions, operation proceeds via connecting node A 426 to step 428, and the supervisory individual may perform the technician functions previously described.

However, in step 558 if the technician function was not selected, operation proceeds to step 560. In step 560, the mode selection is tested to determine if database access was requested. If the selection determined in step 556 is for database access operation proceeds to step 562. In step 562, the user is presented with a list of databases, e.g., VIU system equipment, current system status, technician records, line conditioner records, security information, fault information, etc. The user is also requested to specify the type of access requested, e.g., view or view/modify, and the user is requested for an access password. In step 570 the VIU user interface 302 receives speech signal including database selection 564, access type: read or read/write 566, and password 568. In step 570, the speech recognition module 322 processes the received speech to determine the user database selection, access type, and password. Next, in step 572, the security module 330 used the ID info 386, password information 388, and authorized task information 390 to determine if the user is authorized the access requested. If the user is authorized, control is transferred to the command acceptance module 338 which facilitates the user with interaction to databases 210. However, if access is denied, operation proceeds to steps 576 and steps 578. In step 576, the security module 330 sends information to the text to speech module 324, which generates and sends an access denied message to the user through interface 302. In step 578, the security module 330 issues an alert to the log 366 and it can notify the system administrator of the attempted unauthorized access via email or page.

Returning to step 560, if the selected mode is not database access, operation proceeds to step 580. In step 580, a check is performed to determine if the selected mode is contact access. If the selected mode was not contact access, operation proceeds to step 590. In step 590, the user is notified using speech of invalid input, and operation returns to step 552 where the options prompt is repeated.

In step 580, if the selection is contact access mode, operation proceeds to step 582. In step 582, the user is requested to supply identifying information of the suspected faulty line conditioner/equipment. In step 584 the user enters via speech information identifying the suspect line conditioner/equipment. In step 586, the user interface 302 receives the speech signal and processes the information using the speech recognition module 332 to determine the pertinent identification information. Then the VIU accesses information in databases 210, matches the suspected faulty device to local contact information. The local contact information 588 may be converted to speech by text to speech module 324 and output to the user as speech, e.g., a contact name and a phone number. Additionally, notification information concerning the suspected faulty equipment may be automatically directed to the relevant local contact for prompt testing, troubleshooting and/or repair of the suspect equipment.

In some embodiments, some or all of the features of the present invention may be available via a URL interface in addition to or in place of the voice interface. In addition, in some embodiments, some features of the present invention may be available through a separate interface controlling a specific application. Access to different features may be restricted to different individuals or groups of individuals. For example, the voice interface may be used by an authorized technician to select line conditioning functions, call back, and keypad testing. The updating of databases may be performed by authorized supervisory level personnel via a URL interface and access to an Intranet. The load/simulator functions may be controlled via a standalone application available to a VIU developer troubleshooting the VIU interface.

In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

What is claimed is:

1. A method of operating a line conditioning device interface unit comprising:
   receiving a telephone number corresponding to a telephone line to be conditioned;
   performing a database look-up operation to identify a line conditioning unit corresponding to said received telephone number, wherein said database lookup operation includes accessing a database including line number portability information, said line number portability information associating said received telephone number including an area code corresponding to a first geographic area with a line conditioning unit corresponding to a second geographic area to which said received telephone number has been ported; and
   transmitting control information to the identified line condition unit to cause said line conditioning unit to perform a line conditioning operation on said telephone line.

2. The method of claim 1, wherein said step of receiving a telephone number includes receiving a first audio signal; the method further comprising:
   determining from said first audio signal said telephone number.

3. The method of claim 2, wherein said step of determining from said audio signal said telephone number includes performing a speech recognition operation on said telephone number.

4. The method of claim 1, further comprising:
   receiving an audio signal including information indicating a line conditioning operation to be performed.

5. The method of claim 4, further comprising:
   performing a speech recognition operation on at least a portion of said received audio signal to determine said line conditioning operation to be performed.

6. The method of claim 5, wherein said step of:
   transmitting control information to the identified line condition unit includes:
      transmitting a control signal through an interface included in said line condition unit to control said line conditioning unit to perform said determined line condition operation on said telephone line.

7. The method of claim 6, wherein said interface is an Ethernet interface.

8. The method of claim 5, wherein said telephone number is received over a first telephone line, the method further comprising:
   receiving an output signal from said line conditioning unit;
   converting at least a portion of said output signal into a speech signal; and
   outputting said speech signal over said first telephone line over which said telephone number was received.

9. The method of claim 8, wherein said step of converting at least a portion of said output signal into a speech signal includes a text to speech operation.

10. The method of claim 5, wherein said line conditioning unit is one of a plurality of different line conditioning unit types, the method further comprising:
    determining the type of the said identified line conditioning unit; and
    wherein said step of transmitting control information to the identified line conditioning unit includes:
       converting an input control signal to a control signal recognized by line conditioning units of the determined type.

11. The method of claim 10, further comprising:
    receiving a second telephone number corresponding to a second telephone line to be conditioned;
    performing a second database look-up operation to identify a second line conditioning unit corresponding to said received second telephone number; and
    transmitting control information to the second identified line condition unit to cause said second line conditioning unit to perform a second line conditioning operation on said second telephone line, said second line conditioning unit being different from said first line conditioning unit.

12. The method of claim 1, further comprising:
    receiving user identification information and a password from an individual seeking to use a line conditioning unit;
    performing a password database lookup operation to determine a stored password associated with the user identified by the received user identification information;
    comparing the determined stored password to said received password to determine they match; and
    denying access to a line conditioning unit when it is determined that the received password does not match the determined stored password.

13. The method of claim 12, further comprising storing a password database used to perform said password database lookup operation, said password database including different passwords for different individuals authorized to use line conditioning units.

14. The method of claim 1, wherein said line conditioning device interface unit includes keypad test functionality, the method further comprising:
prompting a user to press a key on a telephone keypad;
receiving a DTMF signal following said prompt; and
checking the received DTMF signal to determine if it conforms to DTMF signal requirements for a DTMF signal corresponding to the key which the user was prompted to depress.

15. The method of claim 14, further comprising:
communicating to the user whether the performed check indicated compliance with DTMF signal requirements.

16. A method of operating a line conditioning device interface unit comprising:
receiving a telephone number corresponding to a telephone line to be conditioned;
performing a database look-up operation to identify a line conditioning unit corresponding to said received telephone number, wherein said line conditioning unit is one of a plurality of different line conditioning unit types;
determining the type of the said identified line conditioning unit;
receiving an audio signal including information indicating a line conditioning operation to be performed;
performing a speech recognition operation on at least a portion of said received audio signal to determine said line conditioning operation to be performed; and
transmitting control information to the identified line condition unit to cause said line conditioning unit to perform a line conditioning operation on a said telephone line, wherein said step of transmitting control information to the identified line conditioning unit includes converting an input control signal to a control signal recognized by line conditioning units of the determined type;
receiving a second telephone number corresponding to a second telephone line to be conditioned;
performing a second database look-up operation to identify a second line conditioning unit corresponding to said received second telephone number, wherein said second line conditioning unit is second one of a plurality of different line conditioning unit types;
determining the type of the said second identified line conditioning unit; and
transmitting control information to the second identified line condition unit to cause said second line conditioning unit to perform a second line conditioning operation on said second telephone line, said second line conditioning unit being different from said first line conditioning unit,
wherein said step of transmitting control information to the second identified line conditioning unit includes:
converting a second input control signal to a second control signal recognized by line conditioning units of the determined second type, the second control signal having a different format than said first control signal but being used to trigger the same line conditioning operation as said first control signal.

17. A system for controlling at least one line interface unit, the system comprising:
a database including information associating telephone numbers to line interface units, said database including information identifying at least two different line interface units, said database further including line number portability information, said line number portability information associating at least one telephone number including an area code corresponding to a first geographic area with information corresponding to a line conditioning unit serving a second geographic area to which said received telephone number has been ported, said first and second geographic areas being different; and
a voice interface device coupled to said database, said voice interface device including:
i) input means for receiving telephone number information and also for receiving speech indicating a desired line conditioning operation to be performed,
ii) means for accessing said database to retrieve information identifying a line conditioning unit corresponding to a received telephone number; and
iii) a speech recognizer for performing a speech recognition operation on received speech to determine a line conditioning operation to be performed.

18. The system of claim 17, wherein said voice interface device further includes:
means for interfacing with line conditioning units; and
means for generating line conditioning control signals used to control a line interface unit to perform line conditioning operations as determined by said speech recognizer.

19. The system of claim 18, wherein said means for generating line conditioning control signals includes:
means for determining which one of a plurality of different line conditioning unit types is to be controlled; and
means for generating control signals recognized by the type of line conditioning unit to be controlled.

20. The system of claim 18, wherein said voice interface device:
means for storing passwords corresponding to different individuals who may use a line conditioning unit; and
wherein said voice interface device further comprises:
means for checking a user provided password against a stored password corresponding to the particular user who provided the user provided password to determine if the user is authorized to use a line conditioning device.

21. The system of claim 18, wherein the voice interface device further includes:
means for converting signals received from said line conditioning unit into speech.

22. The system of claim 21, wherein said means for converting signals into speech includes a text to speech device.

23. The system of claim 18 wherein said voice interface device further includes:
a keypad test device; and
means for prompting a user of said voice interface to press a key on a telephone keypad.

24. A system for controlling at least a line interface unit, the system comprising:
a database including information associating telephone numbers to line interface units, said database including information identifying at least two different line interface units; and
a voice interface device coupled to said database, said voice interface device including:
i) input means for receiving telephone number information and also for receiving speech indicating a desired line conditioning operation to be performed;

ii) means for accessing said database to retrieve information identifying a line conditioning unit corresponding to a received telephone number;

iii) a speech recognizer for performing a speech recognition operation on received speech to determine a line conditioning operation to be performed;

iv) means for interfacing with line conditioning units; and v) means for generating line conditioning control signals used to control a line interface unit to perform line conditioning operations as determined by said speech recognizer, wherein said means for generating line conditioning control signals includes:

means for determining which one of a plurality of different line conditioning unit types is to be controlled; and means for generating control signals recognized by the type of line conditioning unit to be controlled, said means for generating control signals including:

means for converting a determined line conditioning operation to be performed to a first control signal recognized by a line conditioning unit of a first type; and means for converting the same determined line conditioning operation to be performed to a second control signal recognized by a line conditioning unit of a second type, wherein said second control signal has a different format than said first control signal but is used to trigger the same line conditioning operation as said first control signal.

* * * * *